Figure 1:
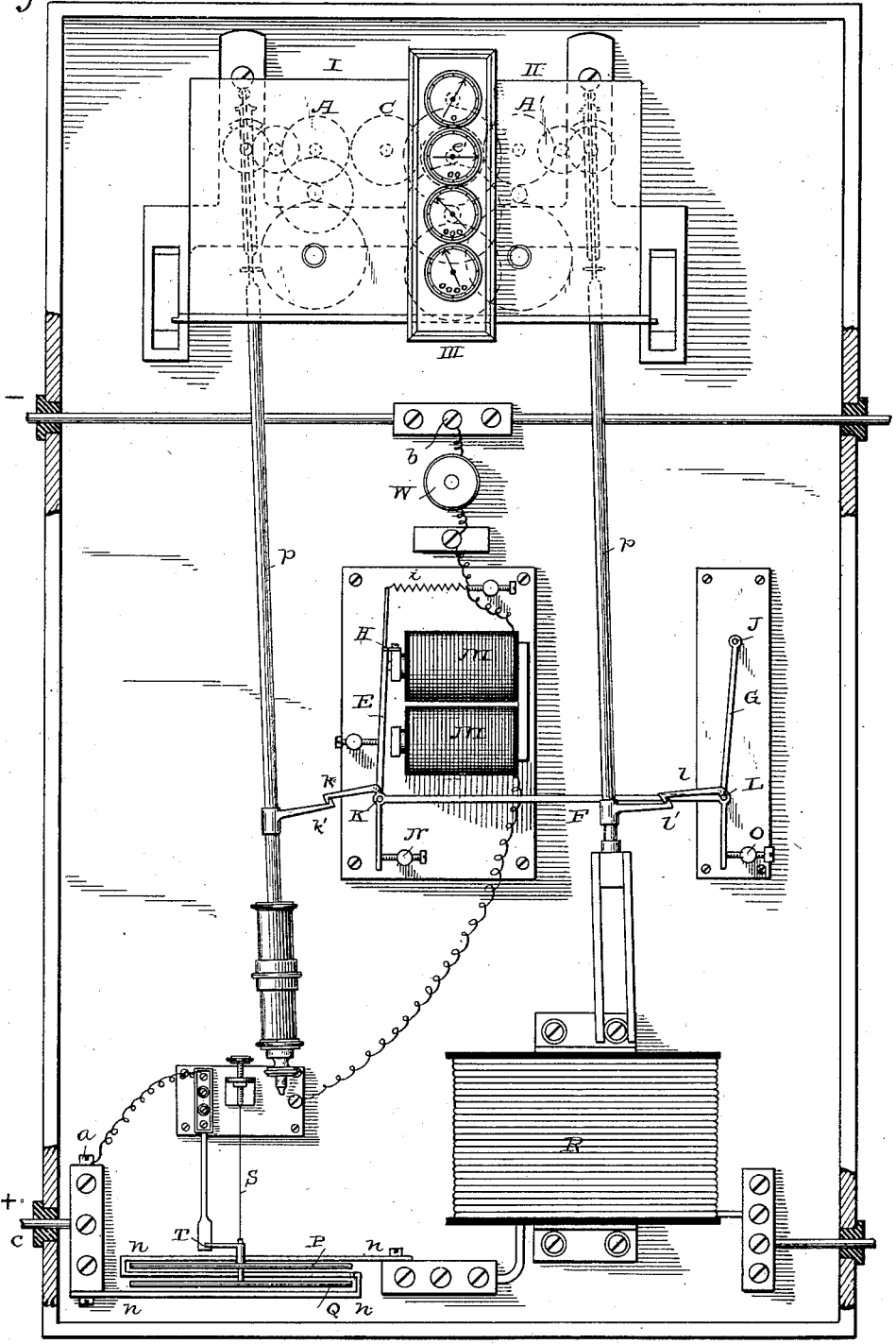

(No Model.) 2 Sheets—Sheet 1.

H. ARON.
APPARATUS FOR MEASURING ELECTRIC CURRENTS.

No. 374,860. Patented Dec. 13, 1887.

Witnesses
H. A. Lamb
Alx. Scott

Inventor
Hermann Aron
By his Attorney Frankland Jannus (No Model.) 2 Sheets—Sheet 2.
H. ARON.
APPARATUS FOR MEASURING ELECTRIC CURRENTS.
No. 374,860. Patented Dec. 13, 1887.
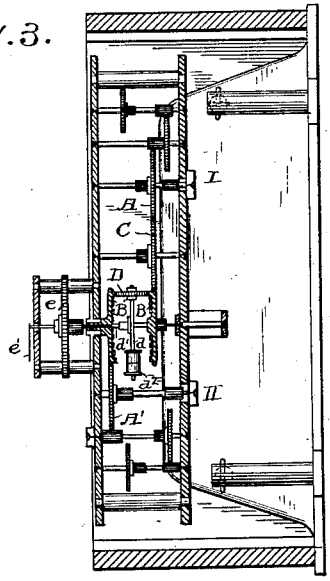
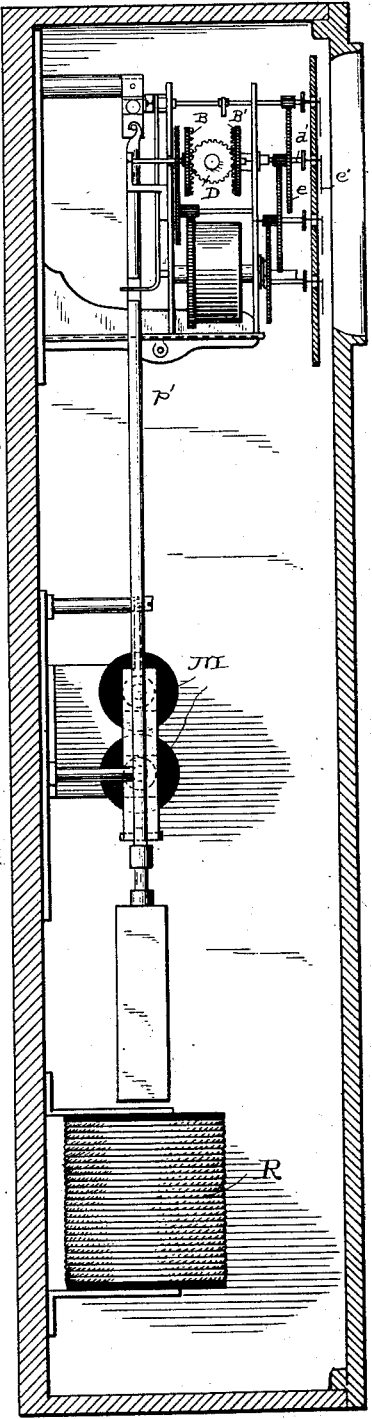
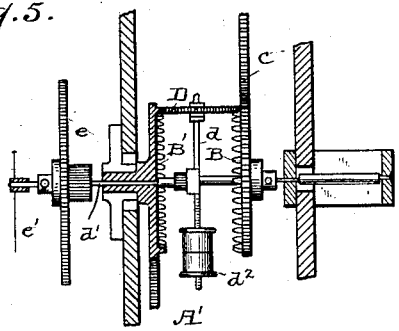
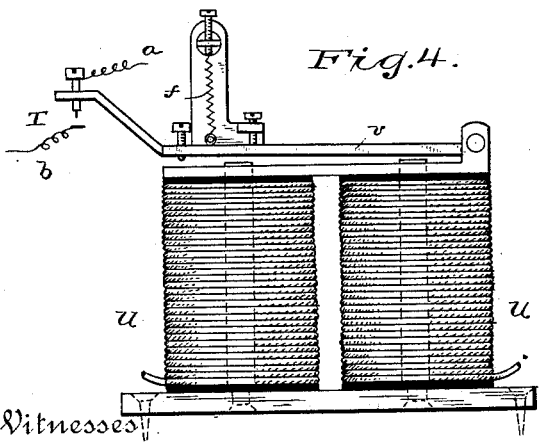
Witnesses
H. A. Lamb
Alx. Scott
Inventor
Hermann Aron
By his Attorney
Frankland Jannus

UNITED STATES PATENT OFFICE.

HERMANN ARON, OF BERLIN, GERMANY.

APPARATUS FOR MEASURING ELECTRIC CURRENTS.

SPECIFICATION forming part of Letters Patent No. 374,860, dated December 13, 1887.

Application filed September 26, 1887. Serial No. 250,769. (No model.) Patented in Belgium November 13, 1886, No. 75,219.

*To all whom it may concern:*

Be it known that I, HERMANN ARON, doctor of philosophy, a subject of the King of Prussia, residing at Berlin, in the Kingdom of Prussia, German Empire, have invented certain new and useful Improvements in Apparatus for Measuring Electric Currents, (for which I have obtained a patent in Belgium, No. 75,219, bearing date November 13, 1886,) of which the following is a specification.

My invention relates to improvements in apparatus for measuring electric currents, and is an improvement upon that for which I have obtained Letters Patent in Great Britain, No. 6,770, dated April 24, 1884.

For measuring or indicating the deviation of two sets of clock-work running at equal speeds, and thereby obtaining the amount of electricity supplied, I had, according to the specification of the afore-cited patent, constructed a differential counter, by which such deviations of the indications of the two clocks were differentially formed by an exclusively geometrical method, and without any mechanism for connecting the two sets of clock-work. At that time I purposely avoided all mechanical gear, and particularly any pressure acting between the two clocks, for the purpose of preventing any irregularity in the motion of either of them occasioned by the other. In the differential counter described in the aforesaid patent there are, indeed, not even frictional resistances acting as long as the two clocks are going at the same speed, as in such case the relative positions of the moving parts of the two clocks do not in the least change. I find that in clocks actuated by equal or approximately equal power—for instance, in two clocks driven by springs, or in two clocks driven by weights—the difference of the indications may as well be formed by means of mechanical devices connecting the two clocks, and causing the two clocks to act upon each other without occasioning any irregularities which might interfere with the object to be obtained. The slight reciprocal actions of pressure between the two clock-works will compensate for slight deviations in the speed thereof in a manner that, provided the duration of the vibrations of the regulating devices be approximately equal, perfect synchronism is established between the same.

In carrying my invention into practice I arrange an intermediate differential counter between the two clock-works the deviations of which are to be indicated. Said differential counter gears with each of the two sets of clock-work and indicates the deviations automatically on a series of dials.

In the accompanying drawings, Figure 1 is a front elevation of an apparatus for measuring electric currents embodying the improvements of my invention. Fig. 2 is a side elevation of the same. Fig. 3 is a plan, and Fig. 4 a modification, of the translator, as will be hereinafter more fully described. Fig. 5 is an enlarged view of part of Fig. 4.

The two sets of clock-work the deviations of which are to be indicated are placed side by side in a casing and marked I and II. The dials are not shown, as they are usually omitted, being not required for the purpose to be obtained.

III is a differential counter placed between the two sets of clock-work I and II, and having any convenient number of dials to indicate the units, tens, hundreds, and so on. Motion is imparted to the differential counter III by means of the second-wheels A and A' of each of the sets of clock-work; but it is evident that any other pair of corresponding wheels of the two works may as well serve for driving the intermediate work. When using the third wheels, for instance, the motion of the differential counter will be quicker in proportion and the indicator more sensitive.

The means by which the differential counter is actuated consist of two crown-wheels, B and B', having cylindrical gear on their opposite faces. The two crown-wheels, Figs. 2 and 3, will turn in opposite directions, for which purpose an intermediate gear, C, is arranged between the wheel A and crown-wheel B.

Between the two crown-wheels B and B' a planet-wheel, D, is arranged, gearing with both wheels B and B', and being capable of turning at the same time round its center and also of rolling along the cylindrical gear of the wheels B and B'. The axis $d$ of this planet-wheel D is vertically mounted upon an axis, $d'$, concentric with the axes of the two crown-wheels. The axis of the front crown-wheel, B', is hollow, and the axis $d'$ extends through the same. On this axis $d'$ are mounted the gear $e$, for working the shafts for the dials of the differential counter, and the finger $e'$. The planet-wheel D may conveniently be balanced by a counter-weight, $d^2$.

Supposing one of the clock-works I or II to be at rest, the other moving, it will be clear that the planet-wheel D will turn around the axis $d'$, rolling along the circular gear of the two wheels B and B'. The axis $d'$ being thereby turned, will advance the finger $e'$ on the dial and the other fingers on their dials with proportional speed. The same result, but with less speed, will be obtained if both sets of clock-works are moving, one being past or behind the other. The finger on the dial in this case will indicate the deviations of the two sets of clock-work. In an apparatus of the class referred to for measuring electric currents the vibrations of the pendulum $p$ of the clock-work II are either accelerated or slackened by the influence of the coil R; or both pendulums $p$ and $p'$ may be influenced in the opposite sense. It will be easily understood, then, that any deviations of the two sets of clock-work occasioned by the influence of the electric current passing through the coil or coils will be exactly and automatically indicated on the dials of the differential counter III. When there is no current passing through the coil or coils, both sets of clock-work will go at the same speed and both crown-wheels B and B' revolve at equal speed opposite each other. The planet-wheel, accordingly, will keep its position as long as the synchronism continues, and turning only around its center $d$ will leave the finger $e'$ and all the depending gear entirely at rest. By this device all deviations of the two sets of clock-work are indicated, even if occasioned by irregularities independent of the current to be measured, and occurring at times when there is no current passing through the coil. To reduce as much as possible such errors, I have further provided means in apparatus of the class described for measuring electric currents which serve to stop the clock or clocks of the apparatus during all the time when there is no current supplied, and to set the clock or clocks immediately going when the current enters. In the drawings this device is shown applied to the two clock-works I and II arranged side by side, one of which being influenced—that is, made to go fast or slow—by the current passing through the coil R. It consists of the combination of the levers E and G and link F. The lever E has its center of motion at H, the lever G is pivoted at J, and the link F connects the two levers E and G, being hinged to them at K and L. The lever E serves as an armature to the electro-magnet M. On the pivots K and L elbowed levers $k$ and $l$ are loosely mounted, having each at the end of one arm a nose or hook, and bearing with its other arm against an adjustable screw, N and O. Each of the hook-shaped arms $k$ and $l$ engages with its nose a corresponding nose formed to an arm, $k'$ and $l'$, extending from each of the pendulums $p$ and $p'$ of the clock-works.

It will be readily understood from the drawings that as soon as a current passes through the electro-magnet M the armature or lever E will be attracted, causing, by means of the connecting-link F, the lever G to swing the same distance aside. By this simultaneous motion the elbowed levers $k$ $l$, resting against the screws N O, will be turned on their pivots K and L, and their upper hooked arms thereby moved rearwardly and at the same time gradually lifted out of engagement with the hooks or noses of the arms $k'$ and $l'$, which accordingly are set free, permitting the pendulums to swing and the clocks to go.

It is of importance that the pendulums before being set free be slightly lifted, in order to fall from a position slightly elevated compared to the position where the hooks engage. The hooks or noses are so shaped that the lever-arms $k$ and $l$ are not immediately disengaged, and in their backward movement draw the pendulums to a little extent along before disengaging, and permitting them to swing in the opposite direction. By this means the hooks $k$ $l$ will to a certainty engage with the hooks $k'$ $l'$, even if the circuit, after having been closed, be immediately interrupted again. A swinging pendulum after receiving its impulses never mounts to the full height from which it has fallen, owing to the resistance of the air and friction. Accordingly the two noses of the arms $k$ $k'$ and $l$ $l'$ would not engage again, if the circuit had been interrupted before an impulse had been imparted to the pendulums; but by aid of this device they will engage without fail, the pendulums being always set free at an elevated position.

For working the stopping or catching device hereinbefore described the main (ampère) current in many cases may not advantageously be employed, because the strength of the said current varies according to the number of lamps or translating devices in circuit at the same time. With such varying current the device will not work satisfactorily. I therefore employ the less changeable volt-circuit brought into action by a switch, which closes the volt-circuit even if but one lamp is being supplied by the main current. In other words, it being essential that the clock-work-stopping devices be released whenever any current is flowing in the main circuit, I include the said device in a subsidiary circuit so arranged that with a source of electricity of constant potential and an intensity of current varying according to the number of translating devices in circuit whenever any portion of the said translating devices are put in circuit with the main conductors the subsidiary circuit will receive the amount of current necessary to release the stopping mechanism and start the clocks.

As will be seen in Fig. 1 of the drawings, the switch closes the volt-circuit between the two posts $a$ and $b$, and in this circuit are included the electro-magnet M and a resistance, W, which latter serves to reduce as much as possible the consumption of current for working the stopping or catching device. For the switch in this device a difficulty exists, owing to the great variability of the current within which it is included changing within limits which have never heretofore been experienced in combination with a switch.

In the drawings I have shown two forms of switches in the main circuit suitable for opening and closing the subsidiary circuit to stop or start the clock. In one of these modifications (shown in Fig. 1) the switch consists of a pair of permanent magnets, P Q, suspended by a torsion-wire, S, and capable of swinging like the needle of a galvanometer. The main current entering at $c$ is guided around said magnet, before passing into the coil R, by means of an S-shaped conductor, $n\ n\ n$. The magnets thereby are turned as soon as the current enters, so as to make contact at T, which closes the subsidiary or volt circuit.

Instead of the switch just described, another form (shown in Fig. 4) may be employed. It consists of an electro-magnet, U, through which the main current passes as through the afore-described conductor $n\ n$. As soon as but one lamp is lighted by the main currents, the latter will pass through the electro-magnet U, which attracts its armature V and closes the volt-circuit by the contact T.

The device works in the following manner: As long as no current passes through the switch and coil R, because there is no supply of current to the circuit into which the apparatus for measuring the current is included, the two pendulums of the two clock-works will be at rest, being engaged with their hooks $k'$ and $l'$ into the corresponding hooks, $k$ and $l$, of the stopping device, as shown in Fig. 1 of the drawings. The moment current begins to flow in the main circuit the switch will close the subsidiary or volt circuit, in which the stopping device is included, vitalizing the electro-magnet M, causing it to attract its armature E, by which the hooks or noses $k\ l$ are lifted and disengaged from the hooks $k'$ and $l'$ and the pendulums set free to swing. One of the pendulums being made to go fast or slow by the action of the main current flowing in the coil R, the two clocks will not run at equal speed, and the slightest deviation will be automatically indicated on the dials of the differential counter III by means of the planet-wheel D, arranged between the gear of the two clocks, substantially as described. The amount of current supplied is counted by the amount of deviation indicated. As soon as the main current is again interrupted, the torsion of the wire S', Fig. 1, or a spring, $s$, Fig. 4, will interrupt the volt-circuit, whereupon the electro-magnet M becomes inactive, the spring $i$ pulls the levers E F G into their former position, as shown in Fig. 1 of the drawings, and the elbowed levers $k$ and $l$ with their hooks again catch the hooks $k'\ l'$ of the pendulums when next they approach.

Having now particularly described and ascertained the nature of my said invention and in what manner the same is to be performed, I declare that what I claim is—

1. An apparatus for measuring currents of electricity, comprising a plurality of sets of clock-work normally running at substantially equal speeds, a movable connection between the sets of clock-work, and an indicating device connected with and arranged to be operated by the said movable connection to indicate variations of speed between the separate sets of clock-work produced therein by the main current, substantially as set forth.

2. In an apparatus for measuring currents of electricity, the combination of two similar clocks, differential counting devices geared to both of said clocks by equal differential gearing and acting to register the differences in speed between the two clocks, and an electric circuit including an electro-magnet arranged to impede or accelerate the movement of the pendulums of either or both of the clocks, substantially as described.

3. In an apparatus for measuring currents of electricity, the combination of two clocks normally running at equal and similar speeds, a counting device, and a planet-wheel engaging both systems of clock-work and connected to the counting devices, whereby the counting device will be operated by and register the difference in speed between the two clocks, substantially as described.

4. In an apparatus for measuring currents of electricity, the combination, with two sets of clock-work running at equal speeds, of similar gear-wheels, B B', secured to corresponding parts of the respective sets of clock-work, planet-wheel D, engaging the gear-wheels B B' and counting devices, and connections between the planet-wheel and the counting devices, substantially as described.

5. In an apparatus for measuring currents of electricity, the combination, with the clocks arranged to be acted upon by the current to be measured, but normally running at equal speeds, the deviations of said clocks indicating the amount of current to be measured, of a device automatically stopping or catching the pendulum of one of the clocks and actuated by the electric current, whereby, when no current is passing, the pendulums are restrained and the clocks stopped and released and set in motion upon the resumption of the flow of the current to be measured, substantially as described.

6. The combination, with the pendulums of two similar clocks for measuring currents of electricity, of the levers G E, link F, and bell-cranks K L, electro-magnet M, and catches $k$ $k'$, substantially as described.

7. In an apparatus for measuring electric currents, a pair of similar clocks, and a differential counter arranged to be actuated by variations in speed between said clocks, one or both of the clocks being acted upon by the current, so as to cause a deviation between their respective speeds proportionate to the flow of current, and a stopping device arranged to be actuated and controlled by electro-magnetic devices included in a subsidiary circuit and unaffected by the variations of the main current, substantially as described.

8. An apparatus for measuring electric currents, comprising a pair of similar clocks, a device indicating variations in speed between said clocks, and a device for stopping and starting said clocks, said device being included in a subsidiary circuit, and a switch actuated by the main current and operating to close and open the subsidiary circuit on the starting and stopping of the flow of current, substantially as described.

9. In an apparatus for measuring electric currents, the combination, with an electromagnetic stopping and setting-in-motion device, of a pair of permanent magnets, P Q, torsive suspension devices S, conductor $n$, passing above and below said magnets, causing them to deviate like the galvanometer in response to changes in the current, and a contact, T, for closing a circuit controlling the stopping and starting devices, substantially as described.

10. In an apparatus for measuring currents of electricity, the combination, with a pair of clocks for indicating the variations of the main current, a pair of torsively-suspended astatic magnets acting to close a subsidiary circuit including a stopping and starting mechanism controlling the clocks, of an S-shaped conductor, between the bends of which the suspended magnets are arranged and through which the main current passes and deflects the magnets, thereby opening and closing the subsidiary circuit and stopping and starting the clock-controlling devices, substantially as described.

In witness whereof I have hereunto signed my name in the presence of two subscribing witnesses.

HERMANN ARON.

Witnesses:
 B. ROI,
 OTHMAR LENZ.